S. PUFFER.
GATE.
No. 57,967. Patented Sept. 11, 1866.
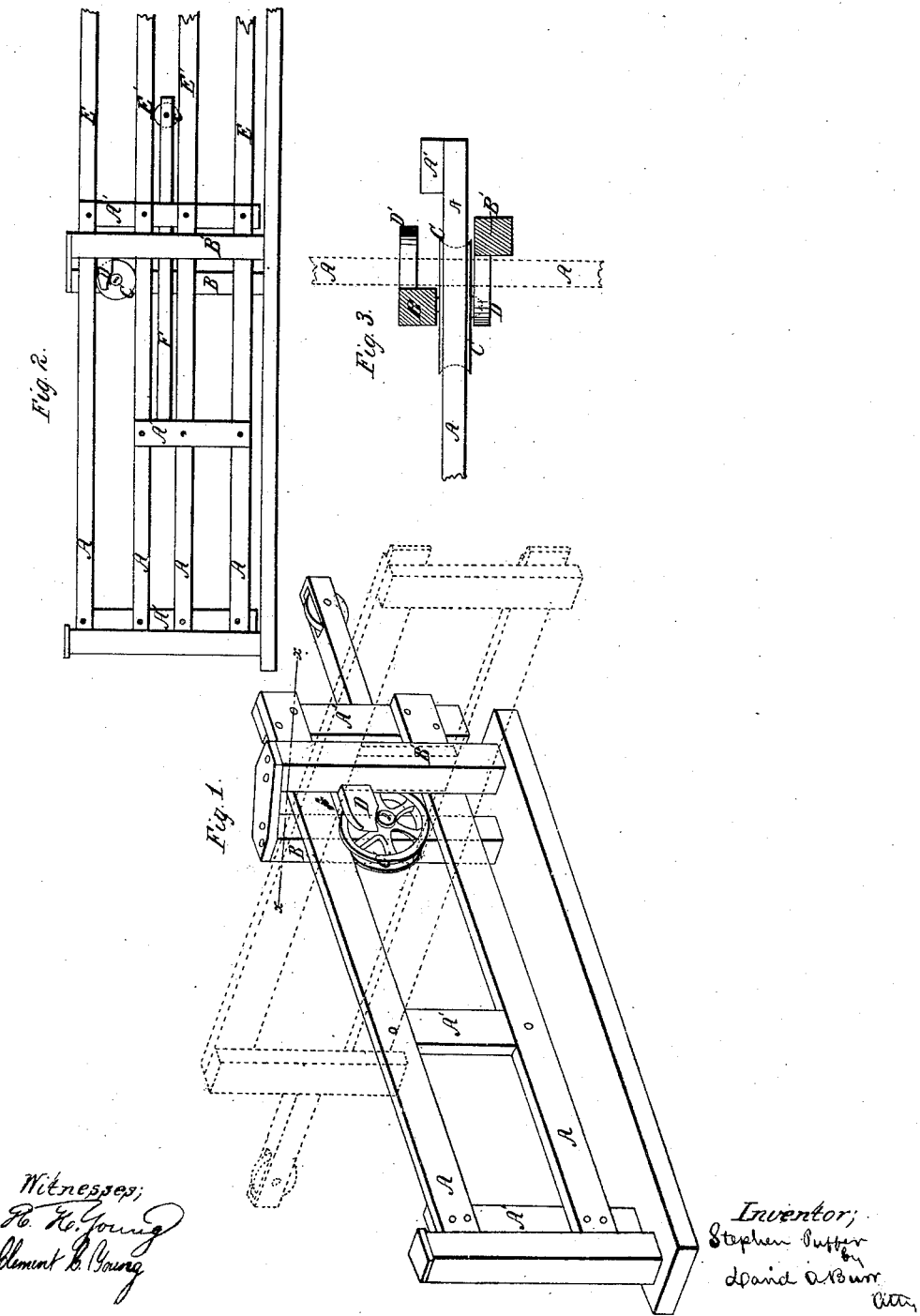

UNITED STATES PATENT OFFICE.

STEPHEN PUFFER, OF OXFORD, NEW YORK.

IMPROVEMENT IN GATES.

Specification forming part of Letters Patent No. 57,967, dated September 11, 1866.

*To all whom it may concern:*

Be it known that I, STEPHEN PUFFER, of Oxford, in the county of Chenango and State of New York, have invented certain new and useful Improvements in Gates for Farming and other purposes; and I do hereby declare that the following is a full, clear, and exact description thereof, reference being had to the accompanying drawings, which form a part of this specification, and in which—

Figure 1 is a perspective view of one form of gate with my improvements attached, illustrating in red lines the position of the gate on its stationary supporting-bars when thrown open; Fig. 2, an elevation of another form of gate with my improvements attached, showing manner of applying rear friction-roller for assisting in moving the gate backward and forward; Fig. 3, horizontal section through dotted line $x$ $x$ of Fig. 1.

Similar letters indicate like parts in all the figures.

The nature of my invention consists in the use of a large friction-roller moving on its axis secured to either of the stationary rear posts of a gate, and providing each of said rear posts with a stationary guide-supporting bracket for guiding the gate and keeping the same equipoised when thrown open.

The bars A and uprights A' comprise the frame-work of the gate. The rear vertical posts, B B', are secured in the earth at such a distance apart from each other in an oblique line to the line the gate traverses as to admit of the free passage of the gate between them either way, the space between them being a little greater than the thickness of the gate-bars A.

On the front face of upright B is secured the axis of a large friction-roller, C, the diameter of which roller is nearly equal to the space between the upper gate-bar A and the one next below, and it is so located on said post B as that the lower edge of the upper gate-bar will bear thereon, thus acting as a way for the gate to move on.

To the inner front edge of post B' and the outer rear edge of post B are secured the two guide-bars D and D'. These stationary guide-bars have their upper front edges curved, as shown in Figs. 1 and 2, and are so located on the posts in a line with each other as to receive the lower edge of the upper gate-bar and guide the same off the roller C when the gate is swung open, after it has been moved back far enough to bring its center on a line with the roller C. Thus, when the gate has moved sufficiently far back to swing open, it clears the friction-roller C and is carried on to the guide-bars D and D', on which it rests equipoised.

By the use of the guide-bars the strain consequent upon opening or swinging around the gate is taken off the roller C, as the two bars D D' receive and sustain the entire weight of the gate when opened.

I contemplate the use of a central bar, F, which may be secured as shown in Fig. 2 of the drawings, or in any other convenient manner. The rear end of this bar is provided with a friction-roller, $c$, whose diameter is equal to the space between the two central boards E' of the panel adjacent to the posts B B'. This friction-roller, by traversing the upper and lower edges of boards E', greatly diminishes the power required to move the gate backward and forward.

Any form of catch may be used for securing front end of gate to forward post when closed.

To open the gate it is simply necessary to move the same backward until the central upright, A', is on a line with the forward end of guide-bar D. It is then swung round in the direction indicated by red lines, Fig. 1. The top rail thereof, resting on the supports D and D', keeps the gate evenly balanced when opened.

In swinging back the gate to close the same, the guide-supports D D' conduct the upper rail to its former position on the roller C, on which the gate moves until closed.

Having thus fully described my invention, what I claim therein as new, and desire to secure by Letters Patent, is—

1. Two or more stationary guide-supports for guiding the gate from the friction-roller and sustaining its weight when opened, substantially in the manner and for the purpose herein set forth.

2. The large friction-roller C, having its axis on either of the rear posts of a gate, and smaller friction-roller c, when arranged and combined with stationary guide-supports D D', substantially in the manner and for the purpose herein set forth.

The foregoing specification of my improved gate signed by me this 17th day of July, A. D. 1866.

STEPHEN PUFFER.

In presence of—
   R. G. LEWIS,
   JAMES B. CHURCH.